United States Patent [19]
Irribarren et al.

[11] Patent Number: 5,530,740
[45] Date of Patent: Jun. 25, 1996

[54] SYSTEM AND METHOD FOR INTEGRATING VOICE, FACSIMILE AND ELECTRONIC MAIL DATA THROUGH A PERSONAL COMPUTER

[75] Inventors: Roberto Irribarren, Fremont; Michael Vargo, San Carlos, both of Calif.

[73] Assignee: Contigram Communications Corporation, San Jose, Calif.

[21] Appl. No.: 482,608

[22] Filed: Jun. 7, 1995

Related U.S. Application Data

[63] Continuation of Ser. No. 33,520, Mar. 18, 1993, abandoned, which is a continuation-in-part of Ser. No. 783,686, Oct. 28, 1991, abandoned.

[51] Int. Cl.⁶ .......................... H04M 1/64; H04M 11/00
[52] U.S. Cl. .................. 379/89; 379/67; 379/94; 379/100; 379/212
[58] Field of Search ................... 379/67, 88, 89, 379/94, 100, 212

[56] References Cited

U.S. PATENT DOCUMENTS

| | | | |
|---|---|---|---|
| 4,837,798 | 6/1989 | Cohen et al. | 379/396 |
| 4,916,726 | 4/1990 | Morley, Jr. et al. | 379/88 |
| 4,935,954 | 6/1990 | Thompson et al. | 379/94 |
| 4,972,462 | 11/1990 | Shibata | 379/89 |
| 4,996,704 | 2/1991 | Brunson | 379/100 |
| 4,996,707 | 2/1991 | O'Malley et al. | 379/100 |
| 5,031,113 | 7/1991 | Hollerbauer | 381/44 |
| 5,146,488 | 9/1992 | Okada et al. | 379/89 |
| 5,193,110 | 3/1993 | Jones et al. | 379/88 |

*Primary Examiner*—Jeffery Hofsass
*Assistant Examiner*—Fan Tsang
*Attorney, Agent, or Firm*—Fler, Hohbach, Test, Albritton & Herbert

[57] ABSTRACT

In summary, the present invention is a communication system comprising a voice message system for storing and retrieving voice messages and facsimile data, a computer database accessing system for storing and retrieving text messages from a separate computer system and for converting the text messages into voice messages, and a personal computer which allows a user to generate and receive voices messages, facsimile data, and text messages. The systems are integrated via a network which coordinates the functions of each individual system. Additionally, the input/output ports of the voice message system and the computer database accessing system are connected in a parallel fashion to a personal computer. In this configuration, a user may access voice messages, facsimile messages, and text messages through the personal computer.

14 Claims, 16 Drawing Sheets

| Queue | Sender | Type | Date | Time | Size | |
|---|---|---|---|---|---|---|
| New | Mike Vargo | Voice | Mon Oct 19 | 12:00PM | 7 | Sec |
| Old | Jason Enamait | Voice | Tue Sep 22 | 09:37AM | 1 | Sec |
| Old | Melissa Castrigno | Voice | Tue Sep 22 | 09:41AM | 4 | Sec |
| Old | Melissa Castrigno | Voice | Mon Sep 21 | 05:07PM | 6 | Sec |
| Old | Melissa Castrigno | Fax | Mon Sep 21 | 05:07PM | 1 | Pg |
| Old | Mike Vargo | Voice | Tue Sep 22 | 10:48AM | 1 | Sec |
| Old | Eve Washum | Voice | Tue Sep 22 | 09:57AM | 9 | Sec |
| Old | Roberto Irribarren | Voice | Wed Sep 23 | 11:07AM | 7 | Sec |
| Old | Mike Vargo | Voice | Tue Sep 22 | 10:31AM | 1 | Sec |
| Old | Roberto Irribarren | E-Mail | Tue Sep 22 | 03:09PM | 5 | Sec |
| Old | Outside Caller | E-Mail | Fri Oct 02 | 03:57PM | 7 | Sec |
| Old | Mike Vargo | Voice | Thu Oct 15 | 02:43PM | 9 | Sec |
| Old | Mike Vargo | Voice | Thu Oct 15 | 03:07PM | 8 | Sec |
| Old | Roberto Irribarren | Voice | Mon Oct 19 | 11:53AM | 10 | Sec |
| Old | Mike Vargo | Voice | Wed Sep 23 | 11:30AM | 6 | Sec |
| Old | Mike Vargo | Fax | Wed Sep 23 | 11:30AM | 1 | Pg |

FIG. 3D

SYSTEM AND METHOD FOR INTEGRATING VOICE, FACSIMILE AND ELECTRONIC MAIL DATA THROUGH A PERSONAL COMPUTER

This is a continuation of application Ser. No. 08/033,520 filed Mar. 18, 1993, now abandoned, which is a continuation-in-part of Ser. No. 07/783,686, filed Oct. 28, 1991, entitled INTERFACE SYSTEM AND METHOD FOR INTERCONNECTING A VOICE MESSAGE SYSTEM AND AN INTERACTIVE VOICE RESPONSE SYSTEM now abandoned.

BRIEF DESCRIPTION OF THE INVENTION

This invention relates generally to integrated voice, facsimile, and electronic mail systems. More particularly, this invention relates to a system which allows a user to input, access, and manipulate voice, facsimile, and electronic mail data through a personal computer.

BACKGROUND OF THE INVENTION

Typically, office communications are stored in two formats, voice messages and text messages (electronic mail, or E-mail). Recently, a third format, facsimile communication, has become prevalent in the business community. Generally, voice messages are stored and accessed via a dedicated voice mail system connected to a private branch exchange (PBX) or directly to the local telephone system. Text messages are usually stored and accessed on a computer system separate from the voice message system and are usually only accessible via another computer or terminal. Recent advances in text to speech (TTS) conversion systems have made it possible to access previously stored text messages via a telephone. However, these systems are usually dedicated to text message access and to retrieving other database information stored in text form within the computer system. As depicted in FIG. 1, each of the office communications systems must be separately accessed by a remote user.

Voice message systems, also known as voice mail systems, have become common modes of communication amongst business persons and consumers alike. Typically, a business organization will have a PBX direct a caller's telephone call to an appropriate extension within the organization. If the connection is not completed, the call is forwarded to a voice mail system wherein the caller may leave a voice message in a "mailbox" having an address corresponding to the extension called.

A commercially available system which provides the above basic messaging functions plus a number of optional functions such as automated dispatch, automated reception service, verbal bulletin boards, and paging is the VoiceMemo II™ voice processing system. VoiceMemo II™ is a trademark of Centigram Communications Corporation, San Jose, Calif. The stand alone VoiceMemo II™ is capable of storing up to 960 hours of messages in support of up to 10,000 users utilizing up to 120 telephone lines.

Design of voice mail systems, as in the VoiceMemo II™ system, incorporates one or more microprocessors to control call distribution, mailbox allocation, and user prompt upon playback. Typically, the voice messages are digitized and stored on one or more hard disk drives. A user may subsequently request the voice messages which the voice mail system has stored. Upon user request, the microprocessor will access the disk drive and have the digitized message or messages retrieved and converted into an analog signal which is then played to the user. The user may then command the system via the touchtone keypad of the telephone to delete the message, forward it to another mailbox, or save it.

Optionally, the VoiceMemo II™ system can be integrated with a FAX card for receiving and transmitting facsimile transmissions. The system, known as FaxMemo™, is capable of storing, retrieving and manipulating facsimile messages in much the same manner in which voice messages are handled. Using this arrangement, a user can call the VoiceMemo II™ system and be notified that a facsimile addressed to the user has been received. The user may optionally save the FAX, delete it, print it to a default printer located near the user's office, or have the FAX sent to any FAX transceiver (machine) which the user designates by entering the transceiver's telephone number.

In addition to voice mail systems and FAX machines, many offices have electronic mail systems. Typically, a central computer system serves as the host to the electronic mail system and the users interface with the computer via terminals or a network of personal computers (PCs). Each user has a mailbox within the system. The users of the central computer may send messages amongst themselves by typing a message and addressing it to the mailbox address of another user. Users outside of the network that are not directly connected to the central computer may connect to the central computer via a modem. Thus, outsiders using other electronic mail systems may send messages to any known address within an organization's electronic mail system via the modem.

However, until recently, the electronic mail systems could only be accessed by a PC or terminal via direct connection or a modem. To overcome this access hinderance, text to speech (TTS) translators are used to enable a remote user to use a telephone to contact the electronic mail system and have previously stored messages "read" to the user over the telephone. Using the touchtone keypad, the user may optionally forward the message to another electronic mail address, delete the message, or save it. These systems are known in the art as interactive voice response (IVR) systems.

A commercially available IVR system which provides the foregoing basic features is the Voice Gateway System (VGS)® produced by Centigram Communications Corporation, San Jose, Calif. VGS is a registered trademark of the manufacturer. In addition to the standard features of a text to speech system, VGS enables the user to respond to messages by sending previously stored text passages to the sender of the message via the electronic mail system to acknowledge receipt of the message. Also, the IVR system can be used to select and access database information other than electronic mail, such as catalog and sales information. The user may enter data into the selected database via the touchtone telephone keypad. For instance, the data entry capability is useful for sales persons to enter order information from remote locations. In this form, information residing in the database is accessed for read out as well as modified (written to) by the user's touchtone keypad input.

An office having both an electronic mail system with a TTS translator, i.e., an IVR system, and a voice mail system forces the users to remember a number of separate commands and access codes for each system. In addition, separate phone calls must be placed or call transfer used to access each system, this is a cumbersome approach.

It is therefore a primary objective of the present invention to provide a system and method of integrating voice mail systems and IVR systems such that a single call can be placed to access information stored in both systems.

Another objective is to enable a single instruction set to be used to retrieve and manipulate voice and text messages within a comprehensive voice mail/electronic mail system.

Another object of the invention is to enable a single instruction set to be used to retrieve and manipulate voice and text messages within a comprehensive voice mail/ electronic mail system.

Still another object of the present invention is to provide a system and method of integrating voice mail systems, and their corresponding facsimile handling features, with a text message system through a personal computer so that information from both systems may be entered, retrieved, and manipulated through the personal computer.

SUMMARY OF THE INVENTION

In summary, the present invention is a communication system comprising a voice message system for storing and retrieving voice messages and facsimile data, a computer database accessing system for storing and retrieving text messages from a separate computer system and for converting the text messages into voice messages, and a personal computer which allows a user to generate and receive voice messages, facsimile data, and text messages. The systems are integrated via a network which coordinates the functions of each individual system. Additionally, the input/output ports of the voice message system and the computer database accessing system are connected in a parallel fashion to a personal computer. In this configuration, a user may access voice messages, facsimile messages, and text messages through the personal computer.

BRIEF DESCRIPTION OF THE DRAWINGS

Additional objects and features of the invention will be more readily apparent from the following detailed description and appended claims when taken in conjunction with the drawings, in which:

FIGS. 3B, 3C, and 3D depict computer interfaces which may be employed in the apparatus of the invention.

DESCRIPTION OF THE PREFERRED EMBODIMENT

Figure 1:
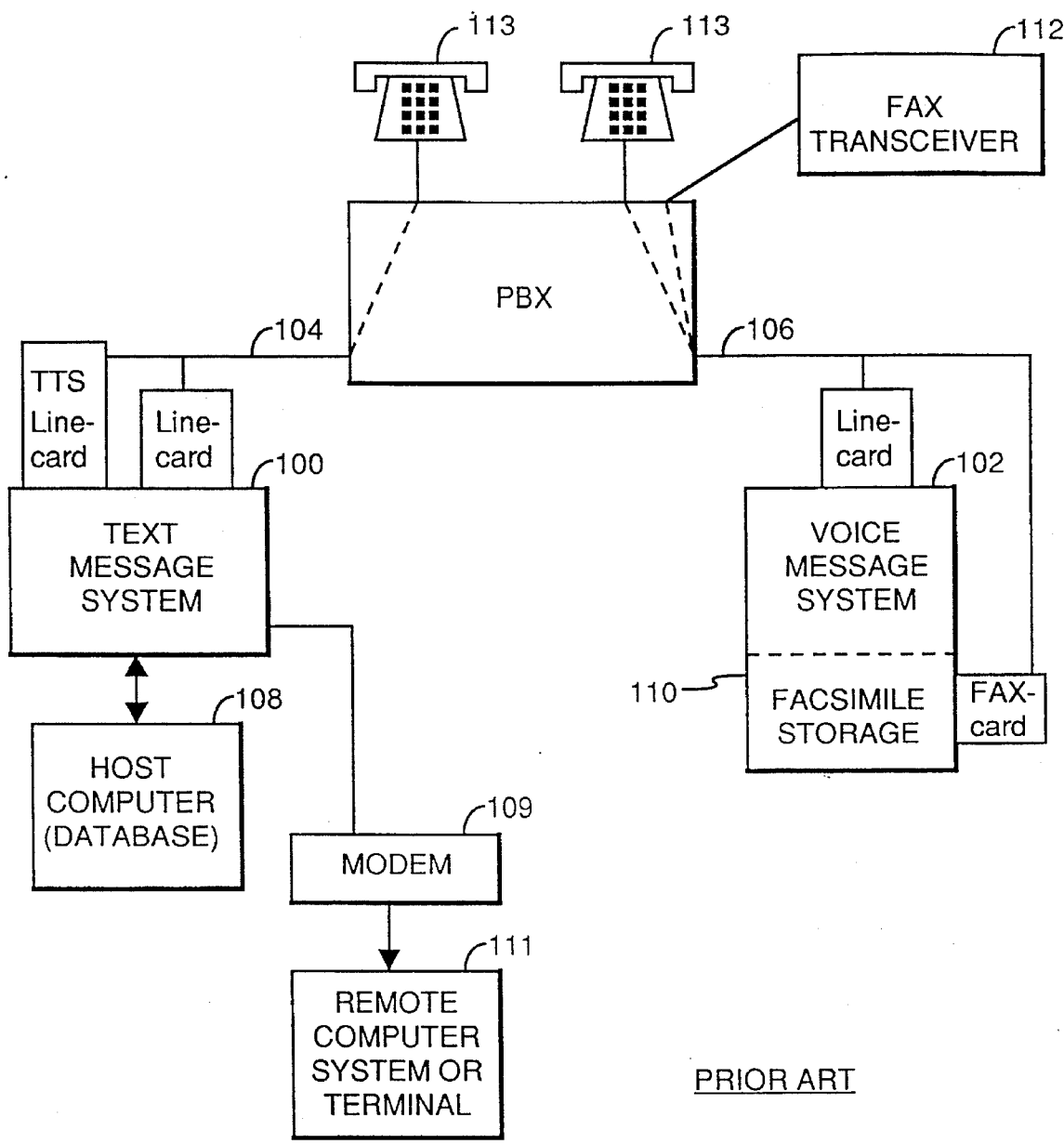
FIG. 1 is a block diagram of a prior art apparatus depicting the separate access paths required to interact with a voice message system and a text message system.

Referring to FIG. 1, there is shown a block diagram of a prior art office communications system. Shown are a text message system 100, e.g., an IVR system, being distinctly separate from a voice message system 102, e.g., a voice mail system. Each system is accessed via different telephone lines 104, 106 and requires the user to make two calls to access information stored within each system or to use a call transfer feature of the PBX to transfer the user's call from one system to the other. In a PBX, the transfer feature is known in the art as a flash hook transfer.

Generally, the text message system 100 provides access to a separate host computer 108 wherein the electronic mail or other database information is stored. The text message system 100 is, in general, a means to facilitate computer database access and should not be construed to be limited to text access alone. The database may store text messages as in an electronic mail system or it may store sales or other data. The host computer 108 may be the server of a Local Area Network (LAN).

In operation, the user calls the system 100, logs in via a user number and password, and is prompted to use the touchtone keypad to command the system 100 to accomplish specific functions. Initially the user will be told by the system 100 how many text messages are addressed to the previously entered user number and how many of those have not been played previously. By touchtone command the user may request a message or messages be played via the text to speech translation subsystem. Replies to the messages are accomplished by requesting the system to send previously stored or "canned" messages to the sender's electronic mail address. These pre-stored messages are typically very simple acknowledgements such as "message received", "message received, I'll get back to you when I return to the office", etc.

Typically, the text message system 100 will be connected to one or more host computers 108 directly, but a modem 109 can also be used to permit the user to connect to remote computers 111 to read electronic mail or access databases stored therein. This arrangement provides the user with great flexibility in manipulating database information in a variety of locations via a telephone.

The apparatus and process of accessing the databases of a host computer via a telephone is old in the art. A representative patent of such a system is U.S. Pat. No. 4,716,583, entitled VERBAL COMPUTER TERMINAL SYSTEM, issued to Groner et al. on Dec. 29, 1987 and assigned to Centigram Communications Corporation of San Jose, Calif. To provide telephone access to computer information, text to speech subsystems have become prevalent. A representative text to speech apparatus patent is U.S. Pat. No. 4,979,216, entitled TEXT TO SPEECH SYNTHESIS SYSTEM AND METHOD USING CONTEXT DEPENDENT VOWEL ALLOPHONES, issued to Malsheen et al. on Dec. 18, 1990. Each of these patents are incorporated herein by reference.

In addition to the text message system 100, office communications systems typically include a voice message system 102 as depicted in FIG. 1. These systems are accessible via telephone such that voice messages may be retrieved and manipulated via touchtone commands. A patent which is representative of voice message systems in general and herein incorporated by reference is U.S. Pat. No. 4,371,752, entitled ELECTRONIC AUDIO COMMUNICATION SYSTEM issued to Mathews et al. on Feb. 1, 1983.

In addition to the standard voice message systems 102 which enable callers to record messages which are subsequently replayed, forwarded, or deleted by the user via a telephone 113, recent developments have enabled facsimile (FAX) messages to be stored as image files within the voice message system storage, i.e. disc drive, represented by reference numeral 110 in FIG. 1. These FAX messages may be manipulated in the same manner as the voice messages. The user, upon the system instructing him or her that a FAX has been received, may forward the FAX to any number to which a FAX transceiver in the form of a FAX machine or other FAX receiving system is attached, forward the FAX image file to another voice mail address, have a hard copy printed on the office FAX machine 112, or delete the FAX. These basic functions and more are available in the FaxMemo system manufactured by Centigram Communications Corporation of San Jose, Calif.

Figure 2:
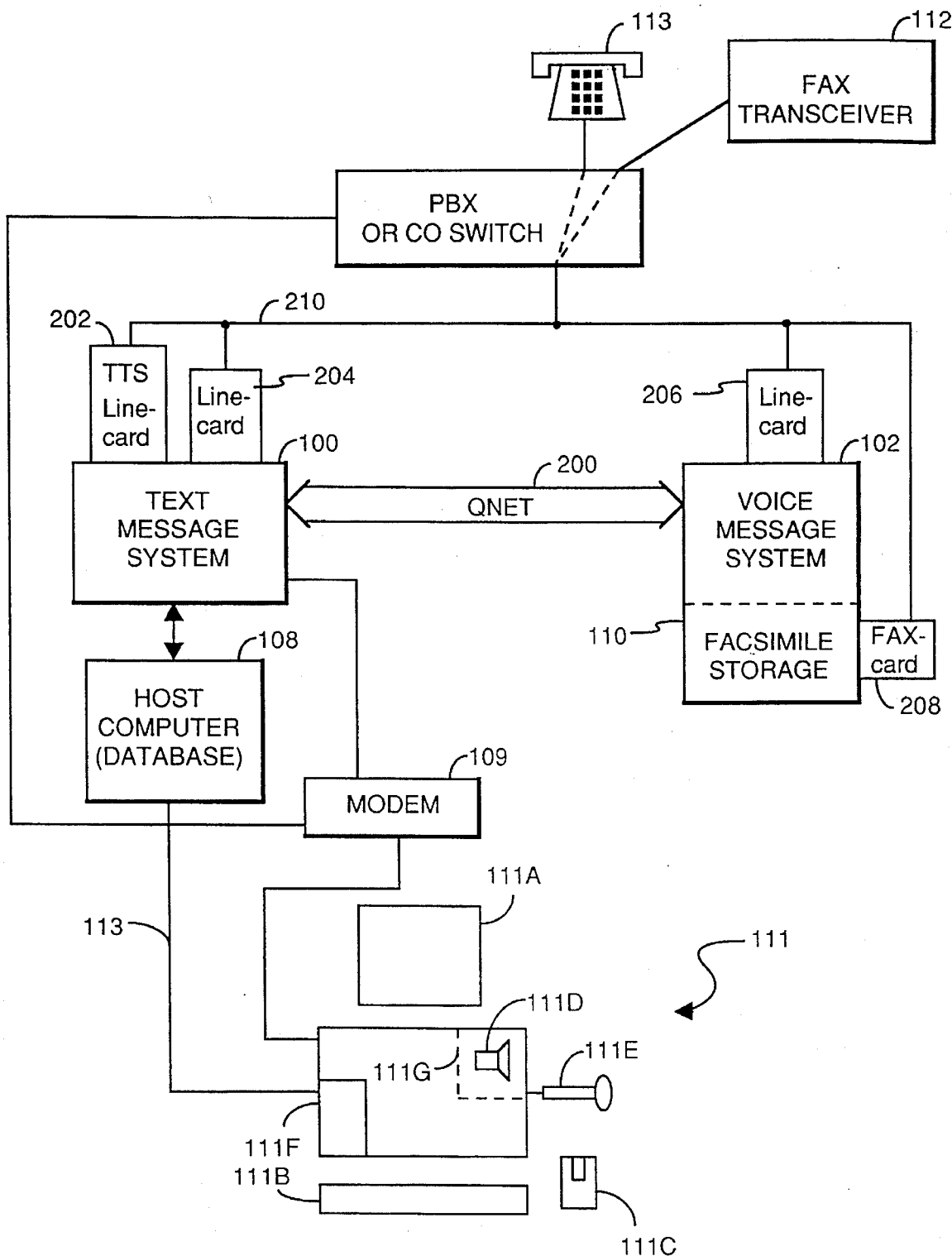
FIG. 2 is a block diagram of the preferred embodiment of the invention.

Referring to FIG. 2, depicting the preferred embodiment of the invention, a network 200 is disposed between a computer database accessing means for storing and retrieving text messages and a voice message means for storing and retrieving voice messages (voice message system 102) Interface apparatus 202, 204, 206, 208 for connecting each system to the telephone lines, i.e., linecards 204, 206, TTS 202, and FAX input/output ports 208, are connected together such that a single telephone line 210 may access both systems. In the depicted preferred embodiment, the computer database accessing means is a text message system 100 accessing a host computer 108 resident electronic mail system. Alternatively, the user, in addition to accessing electronic mail, can access specific database information that is stored in a text format. Additionally, the host computer system 108 does not have to be maintained as an external unit, but can be integrated into the text message system 100.

As will be more fully described below, a remote computer system 111 is coupled to the text message system 100 and the PBX via a modem 109, alternatively, the remote computer system 111 is directly coupled to the host computer 108 through a local area network (LAN) bus 113. The remote computer system 111, will also be referred to as a "personal computer". As used herein, "personal computer" refers to any IBM-standard personal computer, Apple-standard computer, or workstation. The personal computer 111 includes known components such as a monitor 111A, a keyboard 111B, a mouse 111C, a speaker 111D, and a microphone 111F. The personal computer also includes an ethernet card 111F, or other network card, and a modem 109. The personal computer 111 is also supplied with a sound board 111G. The speaker 111D and microphone 111E may form a portion of the sound board. A Microsoft Multi-Media PC sound board may be used. The Microsoft MultiMedia PC sound board is sold by Micrsoft Corporation, Redmond, Wash.

Figure 3A:
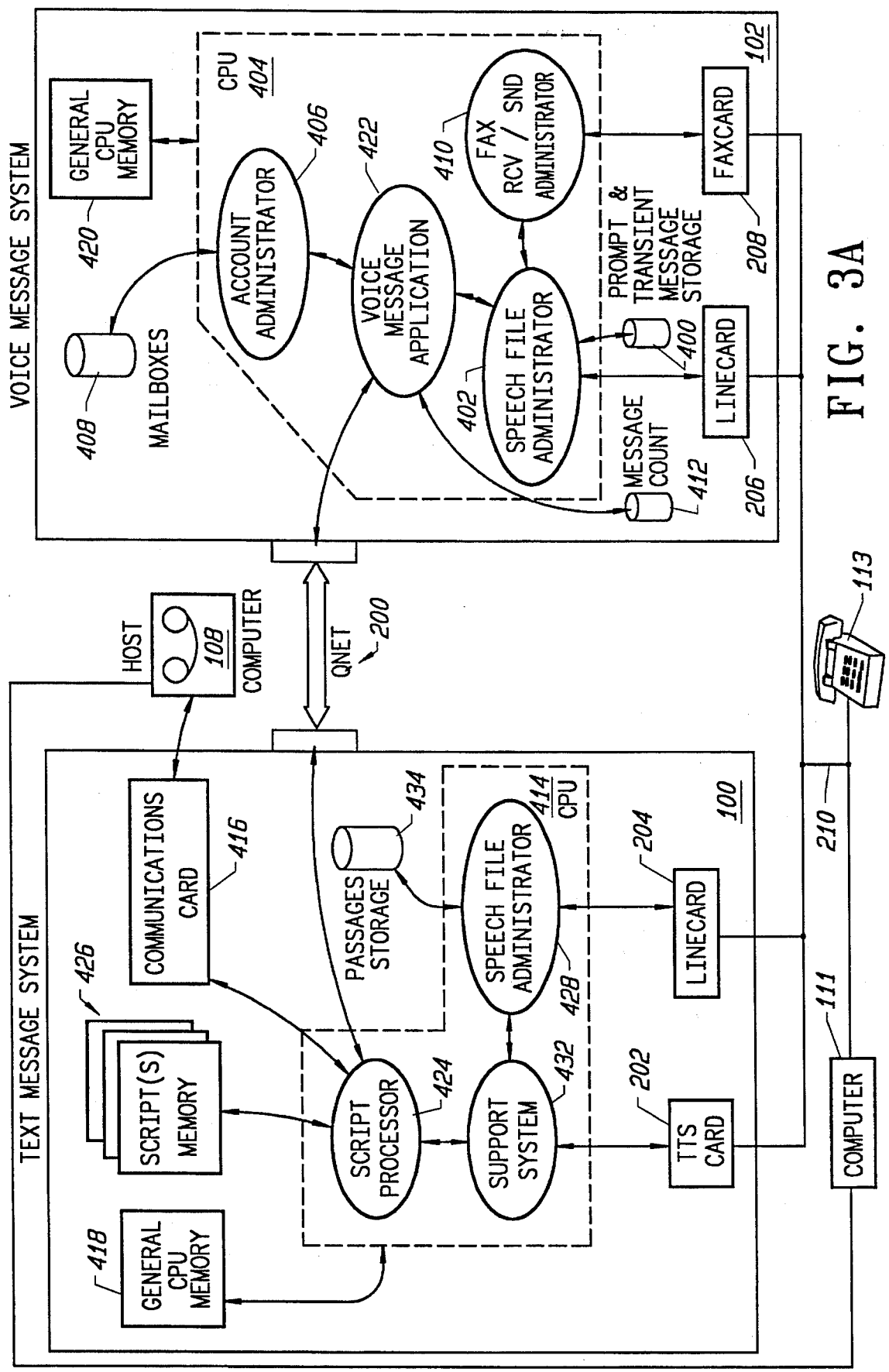
FIG. 3A is a detailed block diagram of the invention depicted in FIG. 2.

FIG. 3A depicts in block diagram form the internal structure of the text message system 100 and the voice message system 102 as well as the local area network 200 which bridges between the two systems. These block diagrams are based upon the VoiceMemo II™ and Voice Gateway Systems® manufactured by Centigram Communications Corporation; however, the use of these systems as the basis for the following discussion should not be construed as limiting the invention to use with only these systems. As will be described, the local area network 200 which coordinates the operation of the systems and creates a comprehensive communications system having both text and voice message manipulation capabilities is applicable with almost any text message system and voice message system having sufficient memory and microprocessors to be host to the local area network software.

In operation, a caller can dial the phone number (or extension number) of a user and be connected to the voice message system 102 via the linecard 206 in the event the user does not answer the telephone. A number of prerecorded prompts and transient messages such as a greeting and instructions on how to reach a receptionist or leave a message are stored in disk memory 400. These are accessed by the speech file administrator 402, a subprogram which is executed by the voice message system microprocessor 404. The prompts are played in a sequence which leads the caller through the process of leaving a message for the user. The account administrator 406, a subprogram executed by the microprocessor 404, places the message in the user's mailbox which corresponds to his or her extension. Typically, the mailboxes are located upon one or more hard disk drives 408, but with advances in technology, it is foreseeable that optical disks or some other mass storage device will be useful for mailbox allocation in the future.

In addition to the voice message, a facsimile may be transmitted by a caller and stored in a mailbox. For instance, the caller may call an extension and be directed to the voice message system 102. The prompt menu will include a prompt which enables the caller to command the system 102, by depressing a specific key on the telephone touchtone keypad, to prepare to receive a facsimile. The caller may leave a voice message as an introduction and then send the FAX to the desired mailbox. The FAXcard 208 receives the facsimile data and the FAX RCV/SND administrator 410, a subprogram executed by the microprocessor 404, tags the digital image file which represents the facsimile as a speech file to be stored in a mailbox location on the disk drive 408. The file is stored in digital format at the user's mailbox address rather than automatically printing a hard copy as is done by most office FAX systems.

Since the operation of electronic mail systems is old in the art, their operation will only be briefly reviewed. The host computer's electronic mail or E-mail system receives messages from senders, the functional equivalent to a caller in the voice mail system operation. Typically, the senders utilize personal computers (PC) or terminals which are connected directly to the host computer 108 or via a local area network (LAN). Each sender has a unique local address usually designated by a unique character string to identify the PC or terminal as well as a character string representing the host computer. This enables senders using other computers in other networks to connect to remote hosts via a modem and address messages to users on many networks other than the sender's own network.

The sender's text messages are stored on a hard disk associated with the host computer of the user to whom the message is addressed. Typically, the user may receive the message by connecting to the host computer and retrieving the text message via a computer or terminal. In addition, the network host computer may include communal databases which users may access with their terminals or PCs to update data stored therein.

Figure 3B:
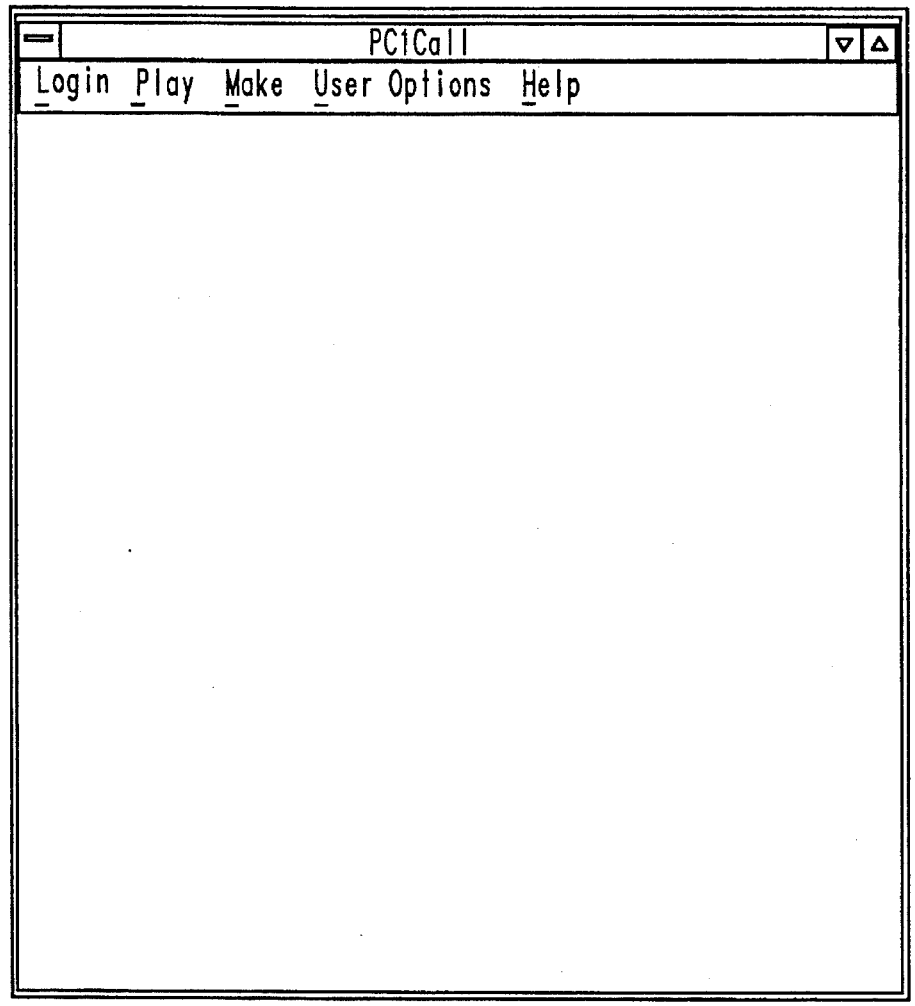

In accordance with the preferred embodiment of the invention, to retrieve any of the messages recorded by senders or callers, a user makes a single telephone call via a touchtone telephone 113, or through computer 111. As previously stated, computer 111 is equipped with a microphone 111C, a speaker 111D, and a sound board 111G to process audio input and output data. In this embodiment, the keyboard 111B operates as a touchtone keypad. In other words, instead of relying upon the numerical input of a touchtone keypad on a telephone, the numerical entries on the keyboard 111B are relied upon for this function. FIG. 3B depicts a menu which may be displayed on monitor 111A. The menu provides a number of options which may be used to operate computer 111 effectively as a touchtone telephone 113. These features will be described below.

In the preferred embodiment, the call is initially handled by the voice message system 102 via linecard 206. However, in the alternative, the call can be handled initially by the text message system 100 via linecard 204 and the following description of the master-slave arrangement would function with the voice message system 102 being the master and the text message system 100 being the slave. Thus, voice and FAX messages may be manipulated as before without interaction with the text message system 100 via the network 200. However, the network 200 is constantly utilized to update the message counter 412 in the voice message system 102 with the number of text messages which are stored and the number that have not been previously read. Thus, the text message system 100 constantly monitors the electronic mail system on the host computer 108 for message activity. When a message is added, read, or deleted an updated count is sent via the network 200 to the voice message system message count memory 412 corresponding to the user's address where the change occurred.

Figure 3C:
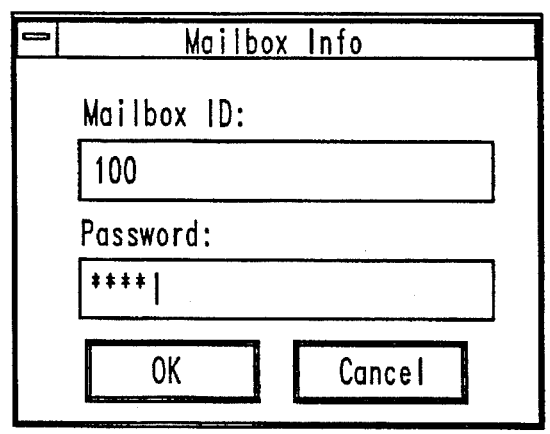
Figure 4:
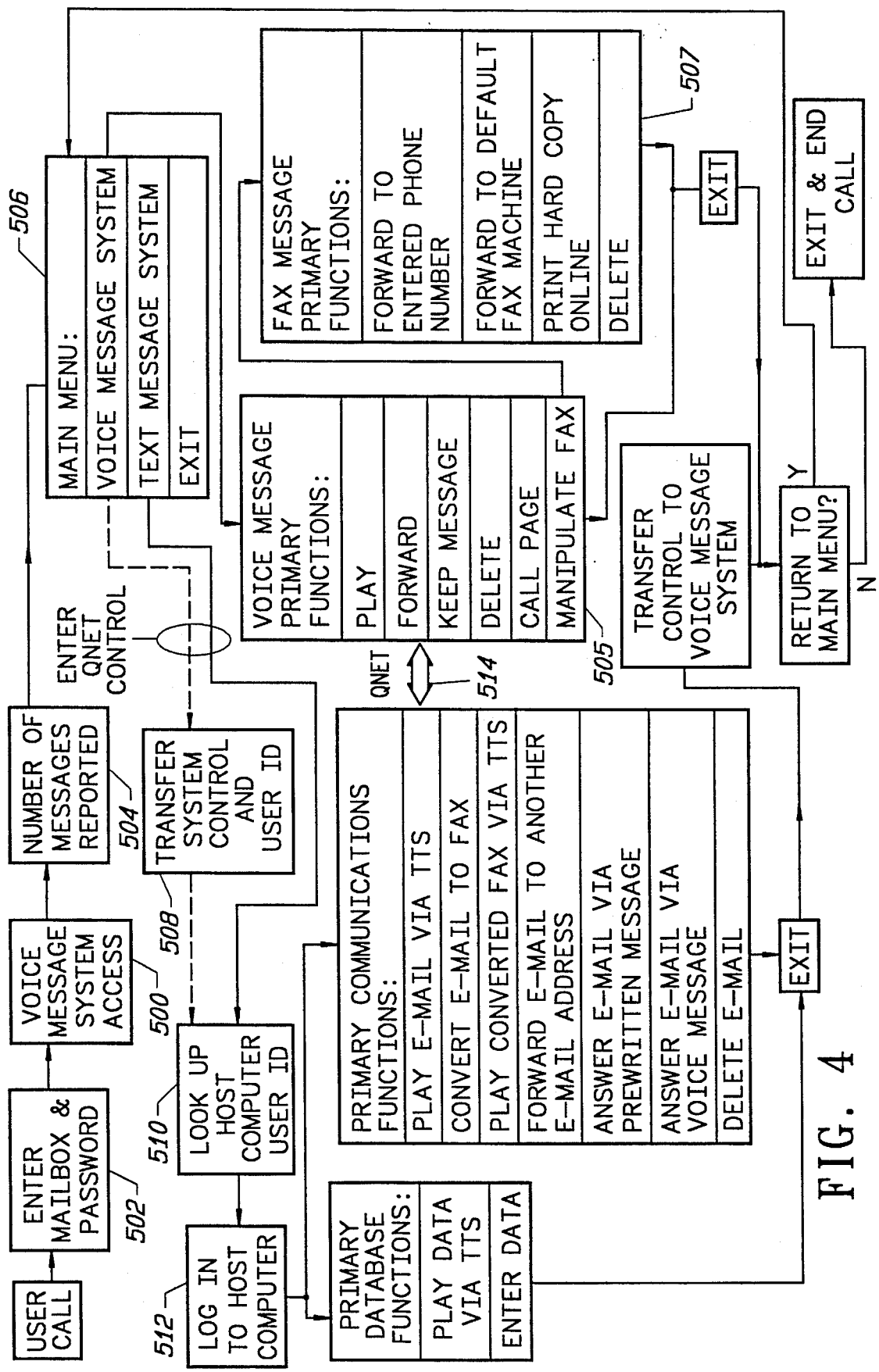
FIG. 4 is a functional block diagram depicting the operation of the preferred embodiment of the invention.

Referring to FIG. 4, the user logs into the voice message system 500 by entering their voice mailbox number and password 502, either through the touchtone digits of the telephone 113 or the keyboard 111B of computer 111. FIG. 3C depicts an interface structure which may displayed on monitor 111A to obtain the required Mailbox ID and Password information, which is entered through keyboard 111B. The voice message system 102 informs the user of the number of text, voice, or FAX messages 504 which are stored and how many have not been played previously. This may be done audibly over the telephone 113 or through the sound board 111G of computer 111. Alternatively, the monitor may visually display the various messages, as shown in FIG. 3D. The prompt menu 506 enables the user to connect to the text message system 100 by depressing a single touchtone key or remain within the voice message system 102 to manipulate voice messages and facsimile messages as described previously. Boxes 505 and 507 shown in FIG. 4 list the primary functions of the voice message system 102. These primary functions may be displayed on monitor 111A, as shown in FIG. 3D. Selection of these functions may be achieved through standard graphical user interface techniques such as "pointing and clicking" with a mouse 111C or entry of a letter corresponding to a designated function. The user interface of FIG. 3D allows one to select a voice message by pointing with a mouse 111C or manipulation of the cursor through keyboard 111B operations. Each message may be played through speaker 111D of computer 111 by using a text-to-speech (TTS) program, as previously described.

Figure 5:
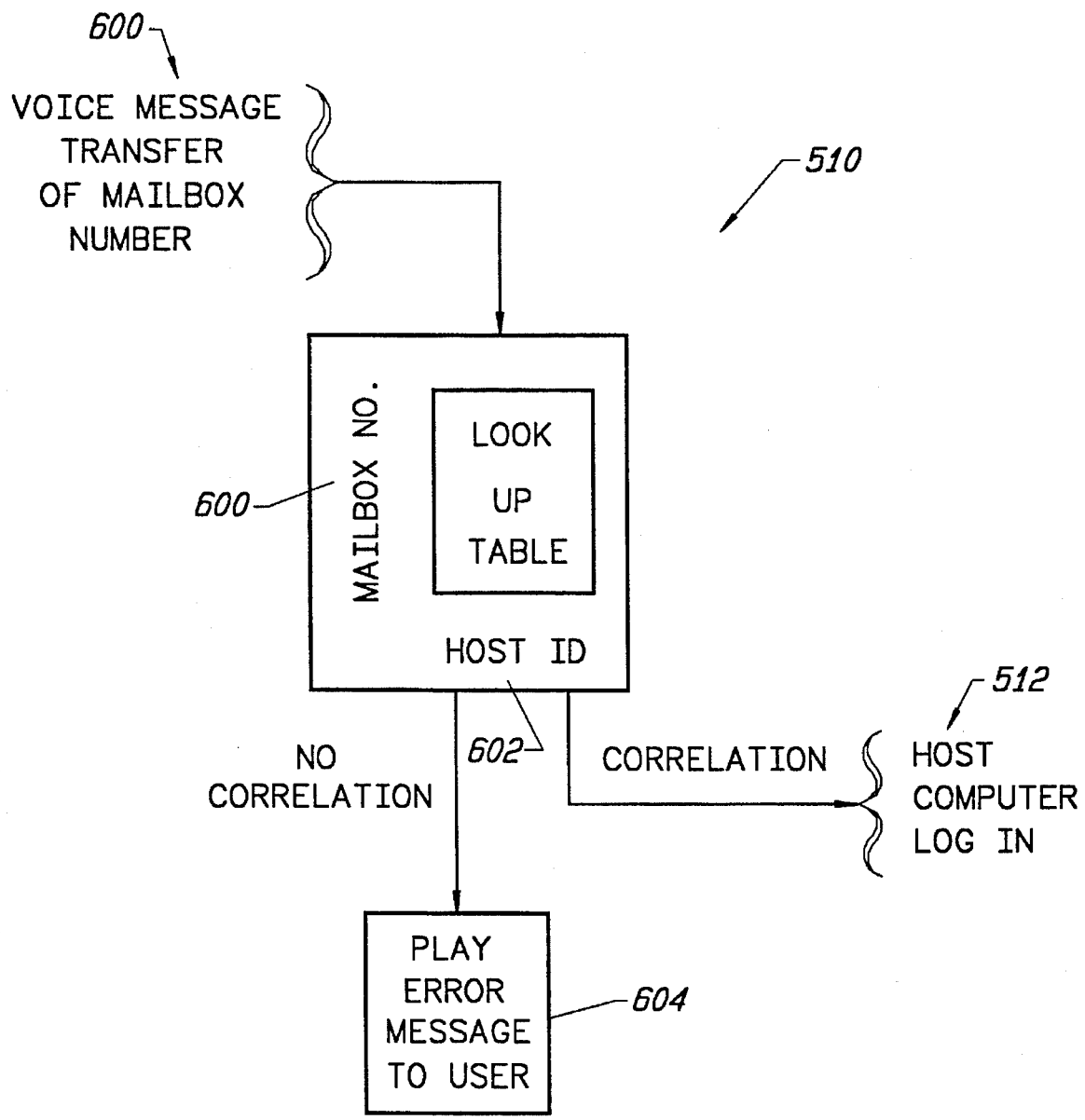
FIG. 5 is a functional block diagram showing the process by which a voice message system mailbox number is correlated with the host computer user identification to facilitate automatic login to the host computer.

Upon depression of a predetermined key, communications system control is passed to the microprocessor or microprocessors 414 in the text message system 100 via the network, step 508. Alternatively, the system can be configured such that control is passed automatically, without user action, upon call connection to the voice message system 102. In addition to passing control, the voice message system passes the user's mailbox number and password to the text message system. Subsequently, the text message system uses a cross reference table 510 as shown in FIG. 5 to correlate the voice message mailbox number 600 to a text message system user ID 602. If the correlation is not found, the user is told so via a verbal error message 604, over telephone 113, or through a verbal message played on speaker 111D, or by a text message displayed on monitor 111A. If the ID 602 is found, the text message system 100 will automatically log the user into their electronic mail account on the host computer 108, step 512, via the communications card 416. If the user has more than one electronic mail account on the same host or different hosts, the text message system 100 will request that the user depress a special key combination to access the desired host and account.

At this point a description of the network operation is necessary. The network 200 is a commercial software product which provides multi-tasking, multi-user, and local area network (LAN) capabilities entitled QNX Operating System that is produced by Quantum Software Systems Ltd. of Ottawa, Ontario, Canada. QNX resides in the RAM memory 418, 420 of both the text message system 100 and the voice message system 102. QNX is used in this application for its multi-tasking and LAN capabilities which enable QNX to coordinate the various tasks executed on each of the message systems via an ARCNET local area network link between the systems in such a way that a substantially seamless, integrated text and voice communication system is created.

In accordance with one aspect of the invention, control of the integrated system is passed from the microprocessor(s) 404 in the voice message system 102 to the microprocessor(s) 414 in the text message system 100. Thus, a master-slave relationship is established via the network operating through the ARCNET LAN link between the systems. More specifically, the main voice message application program 422 enters a slave mode, ready to execute any commands sent to it via the ARCNET LAN connection. The commands are issued by the text message system microprocessor(s) 414 as the text message system 100 becomes the master entity controlling call processing. Typically, the first command issued is a request for the voice message system 102, to send the user's voice mailbox number to the text message system 100.

Subsequent to the initialization of the master-slave relationship, the script processor program 424 becomes the main application program within the text message system 100. The QNX network or QNET function establishes a control system to execute functional tasks in either of the message systems in a coordinated fashion. In other words, tasks which are programmed to be executed by the operating systems of the individual message passing operating systems, e.g., UNIX, are executed by QNET in an administrative role.

To implement the QNET coordinating function, each of the basic tasks accomplished by the text and voice message systems 100, 102 is assigned a unique task identification number. The task ID is assigned by the QNX Operating System using its "clearing house" feature. Upon system initialization, each task is published by name within the "clearing house" and is assigned a task ID. If either system does not know the task ID of a task it desires to execute, it goes to the clearing house and uses the task name to find the task ID used to execute the task. Once this process is completed for an individual task, the requesting system remembers the task ID number and does not use the clearing house on subsequent executions.

A script or scripts 426 are executed by the script processor 424 in the text message system 100 to control the step by step process of retrieving and playing text messages or interacting with a database as the user requests such activity via the touchtone keypad, or keyboard 111B. The scripts 426 may be uniquely tailored for a specific user or set of users. For instance, a user or group of users who never use the sales database would have a script assigned to their user IDs which does not provide them the prompt option of accessing the sales database.

As discussed above in reference to FIG. 4, QNX operating system control is initiated upon special command of the user at the main menu 506. Thereafter, functions of both message systems can be executed in any order via QNET as indicated by arrows 514 in FIG. 4. The functions or tasks listed in FIG. 4 are meant to be exemplary and should not be construed as limiting the invention in any manner. Similarly, the functions shown in FIGS. 3B, 3C, and 3D are exemplary in manner.

Figure 6:
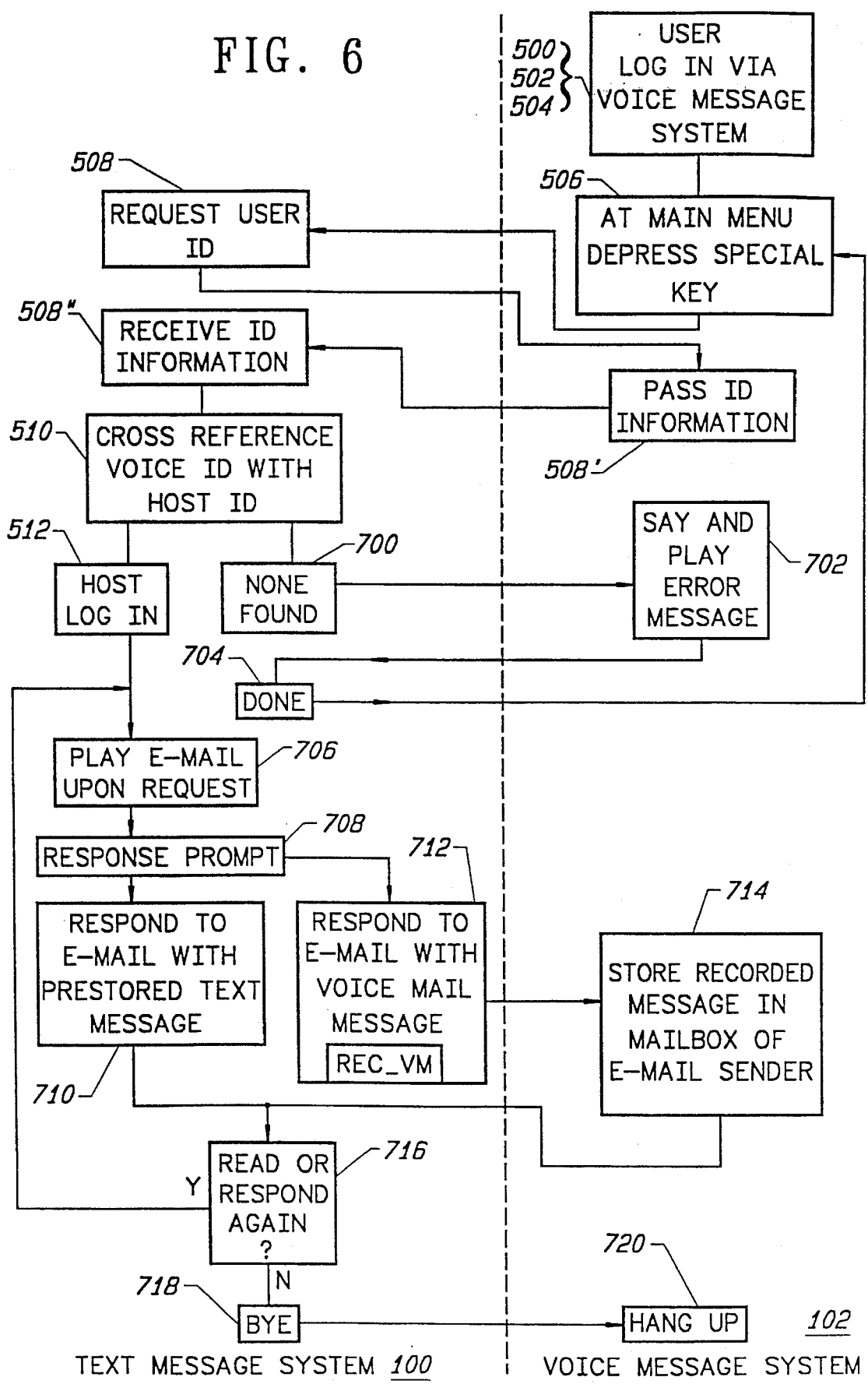
FIG. 6 is a flow chart of the process by which electronic mail messages are received and answered using the invention.

FIG. 6 depicts the process of playing an electronic mail text message and responding to the message via both a pre-stored written message(s) and a voice message to the electronic mail sender's voice mailbox. User login and transfer of control is accomplished as discussed above in connection with FIG. 4, steps 500, 502, 504, 506, 508, and 510. If the look up table does not find a proper user ID for the host computer 700, a SAY command will be sent to the voice message system to preload an error message in the telephone linecard common memory and a PLAY command will play the error message to the user 702. The message may be played to the user over speaker 111E. Alternatively, the SAY command may be used to generate a text message which is displayed on monitor 111A.

When the message is complete, the system operation continues in the text message system at step 704. The DONE command, executed automatically, releases control of the system from QNET and returns the user to voice message system control in the same logical step where the user pressed the digit for text message system access within the main menu 506.

If the proper ID is returned, host login is accomplished at step 512. In operation and referring to FIG. 3, the speech file administrator 428 retrieves and plays the stored prompts 430 as commanded by the support system algorithm 432. The support system 432 coordinates the TTS card 202 operation with the prompt operation to choose text messages to be played. As the prompts are played, the user interacts with the system 100 via either linecard 204 or 206. The linecards interpret user touchtone commands, and equivalent keyboard 111B commands, and are capable of dialing out-going calls at the user's request. The task management operation of the network 200 controls which linecard is used for user interaction during each task execution. The TTS card 202 will read each E-mail message as requested, step 706 in FIG. 6. If one is accessing the system from a computer 111, the E-mail message may be either displayed on monitor 111A or be played over sound board 111G.

Afterwards, the system 100 will prompt the user about the mode of response 708. The user may request that one of the pre-stored text responses stored on disk memory 434 be sent via electronic mail to the address of the sender 710. Choice of the response is menu driven. However, if the user desires to respond to the sender via a voice message 712, QNET will initiate the voice message recording task (REC_VM) in the voice message system 714. The voice mailbox of the sender is determined via the correlation table, FIG. 5, and the voice message system connects the user automatically to the proper mailbox. Once the message has been recorded and saved in the recipient's voice mailbox, QNET returns to the text message system and requests whether the user wishes to read another message 716. If not, the user is finished and hangs up the receiver, or logs off the computer 111. This act initiates the BYE command which returns control to the voice message system 718 and initiates the HANG UP task 720. From here, the voice message system awaits the next call, or logon.

Figure 7:
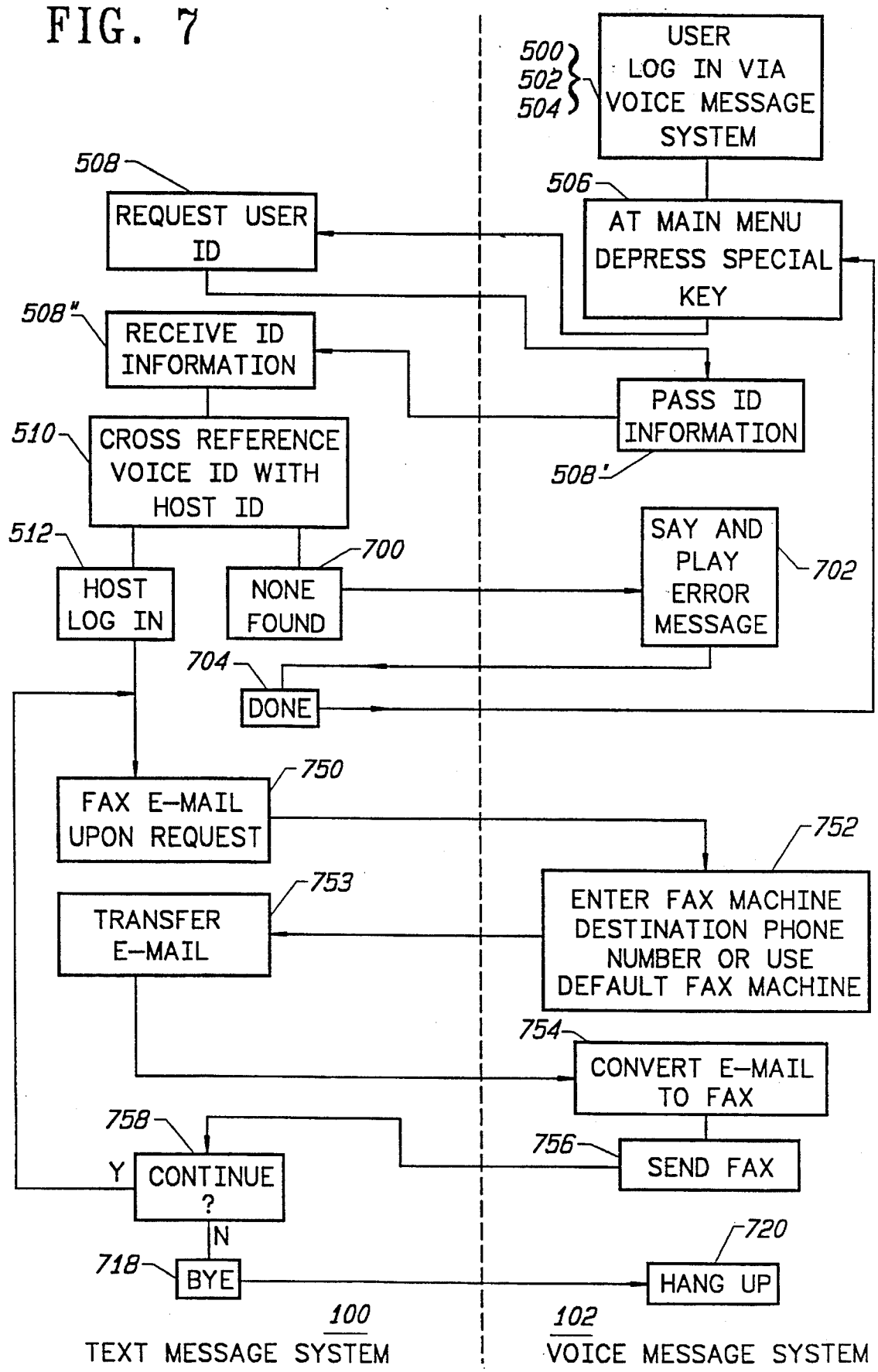
FIG. 7 is a flow chart of the process by which an electronic mail message is forwarded as a facsimile transmission using the invention.

FIG. 7 depicts the process of forwarding an electronic mail message to a FAX transceiver. The process is essentially identical to that which is shown in FIG. 6 through to step 512. After login to the host computer is accomplished, the user, through a menu driven process through the telephone or computer monitor 111A, selects an electronic mail message and indicates to the system the desire to forward that message via facsimile transmission, step 750. Note that the voice message system contains the FAX card; therefore, all facsimile transceiving functions are conducted through that system. The voice message system requests from the user the telephone number to which the FAX is to be sent or whether the default FAX machine should be used, step 752. The electronic mail message is transferred from the text message system to the voice message system 753 and converted from a text format into a facsimile format 754. Finally, the voice message system connects via the phone system to the desired FAX machine and sends the facsimile at step 756. Upon accomplishing the transmission, the process continues within the text message system. The user may continue text message manipulation 758, i.e., read mail, FAX other messages, etc., or hangup, steps 718, 720.

Table 1 summarizes the tasks which the text message system may request the voice message system to accomplish.

TABLE 1

SYNCHRONIZATION TASKS
    GET_USER - retrieves mailbox number of user
    GET_RECIPIENT - retrieves mailbox number of voice
message recipient
    DONE - return control to voice message system without exit
    BYE - summarize mailbox contents to user and exit
LINE CONTROL TASKS
    ANSWER - go off hook
    HANGUP - go on hook
    WAIT_FOR RINGING_Wait for an incoming call
    MAKE_CALL - outdial
CALLER OUTPUT
    GET_INPUT - retrieve caller DTMF digits
    FLUSH - flush out any pending DTMF digits
SPEECH OUTPUT
    SAY - preload a voice message prompt or message
    SAY_NUM - say a number up to 6 digits long
    SAY_EXT - say an 11 digit mailbox number
    SAY_DATE - say date/time (long format)
    SAY_ASCII_DATE - say date/time (ASCII format)
    PLAY_NAME - say the name from a mailbox
    PLAY - output preloaded speech
RECORD TASKS
    RECORD - record a message
    REC_VM - record a message to a mailbox from user
    REC_OUT - record a message to a mailbox TABLE 1-continued APPEND - append a message
CUSTOM
   GET_DATE - retrieve a date/time
FAX
   SND_FAX - send a fax from a text file using voice message system faxcard.
   RCV_FAX - receive a fax via voice message system faxcard The foregoing table of tasks should not be considered to limit the invention in any manner. The tasks which the text message system can request the voice message system to accomplish can encompass any task the voice memo system can accomplish independently.

Figure 8:
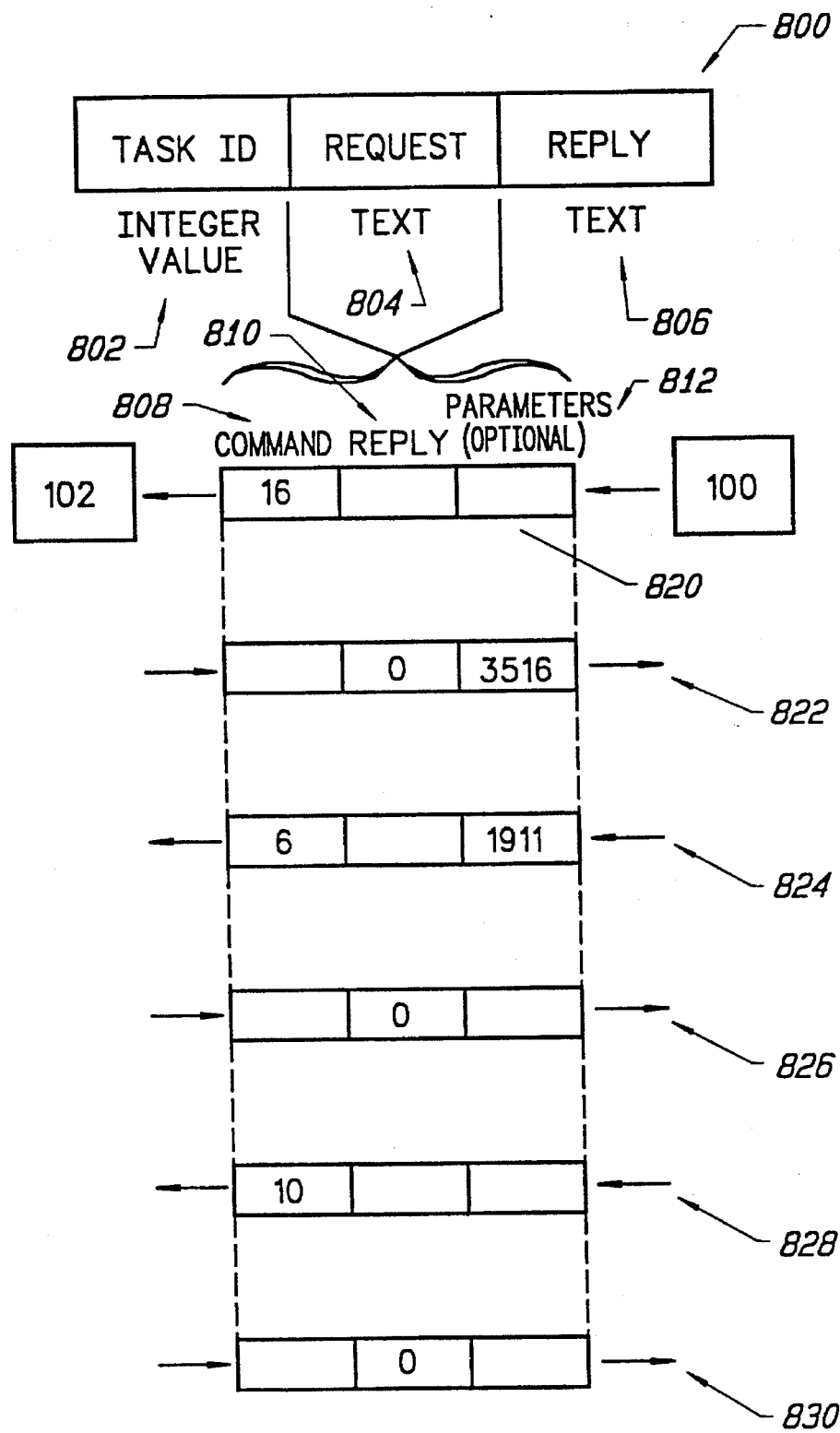
FIG. 8 depicts the network message format.

FIG. 8 depicts the high level message structure 800 of a task command sent by a typical QNX task during system operation. This structure 800 contains the task identification number (TID) 802 of the destination program, the contents of the request 804 and a reply field 806. In essence this structure 800 operates as an envelope specifying the destination routine address as a TID 802 and including a specific task request within the request field 804 as the envelope contents. The TID 802 is the address of the main routine capable of executing the specific request contained in the request field 804. The reply field 806 carries text indicative of whether the message was received or not by the destination task associated with the TID address.

The communication protocol between the voice message system 102 and the text message system 100 is such that the request field 804 is loaded with ASCII text numbers relating to the types of requests as shown in FIG. 8, as reference numerals 822 through 830. For example, a "16" in the command field 808 requests the execution of the GET_USER command. The subsequent reply from the voice message system, also packaged in the envelope form shown in FIG. 8A, will contain in the general reply field 806 a message indicating that the task was received by the proper routine. Within the request field 804 of the envelope is the specific reply message 810 shown at 822. Therein is replied the ASCII character "0" indicating the task was executed, followed by a set of parameters 812 containing the requested information. In this instance, mailbox number 3516.

However, if the mailbox number was not found, the parameter field 812 would contain a "3" indicating an error. An appropriate error message would then be played or displayed to the user. Envelopes 824, 826, 828, and 830 depict the message structures for playing a particular message. Once the text message system 100 has been informed of the error, it requests the voice message system 102 to load a specific prerecorded error message. Command "6" is the SAY command and the parameter field contains 1911 which indicates the appropriate message to be played, e.g., "mailbox not found." The voice message system replies with "0", indicating that the message has been loaded. Subsequently the PLAY command is requested by the text message system indicated by command number "10" and after playing the previously loaded message the voice message system replies with "0".

Figure 9:
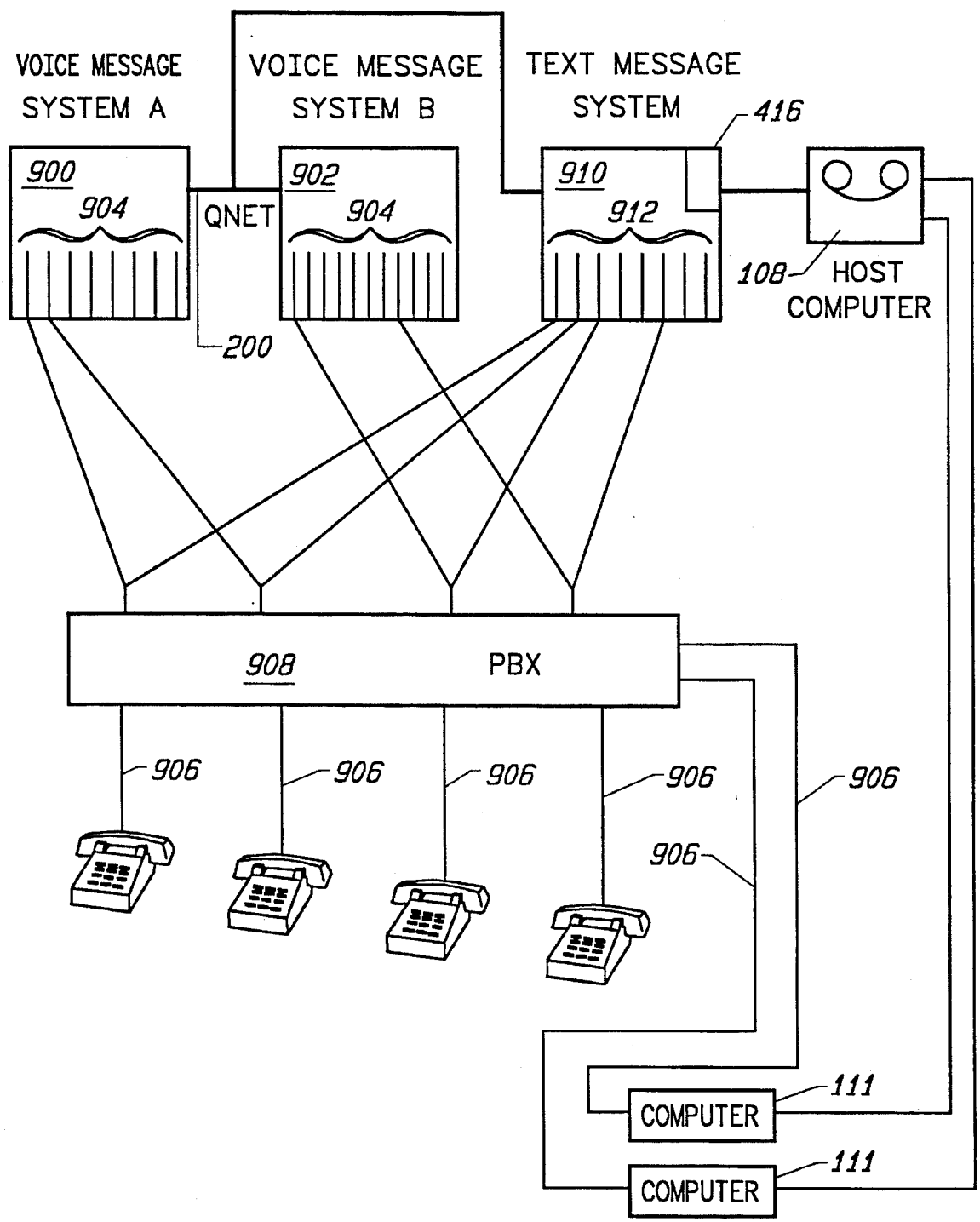
FIG. 9 is a block diagram of the invention incorporated into a practical, multi-user system.

The foregoing discussion focused upon the operation of the invention with respect to a single caller and a single user; however, as a practical matter, a plurality of telephone lines and/or a PBX connected to a telephone trunk line are necessary for the creation of a fully functional system. FIG. 9 depicts such a system in block diagram form. Therein, two, voice message systems 900, 902 are parallel connected via QNET 200 to expand voice message handling capacity. Each user is allocated both a FAXcard and a linecard shown as a single element 904 for simplicity. The FAX and linecards are connected to individual telephone lines 906 via a PBX 908. Correspondingly, the telephone lines 906 and PBX 908 are connected to the text message system 910 via linecard and TTS card pairs. The multi-tasking function of the QNET 200 enables the depicted comprehensive communication system to handle multiple calls from callers and users at the same time. Functionality of the multi-user system is similar to the operation of the single user system discussed previously.

Figure 10:
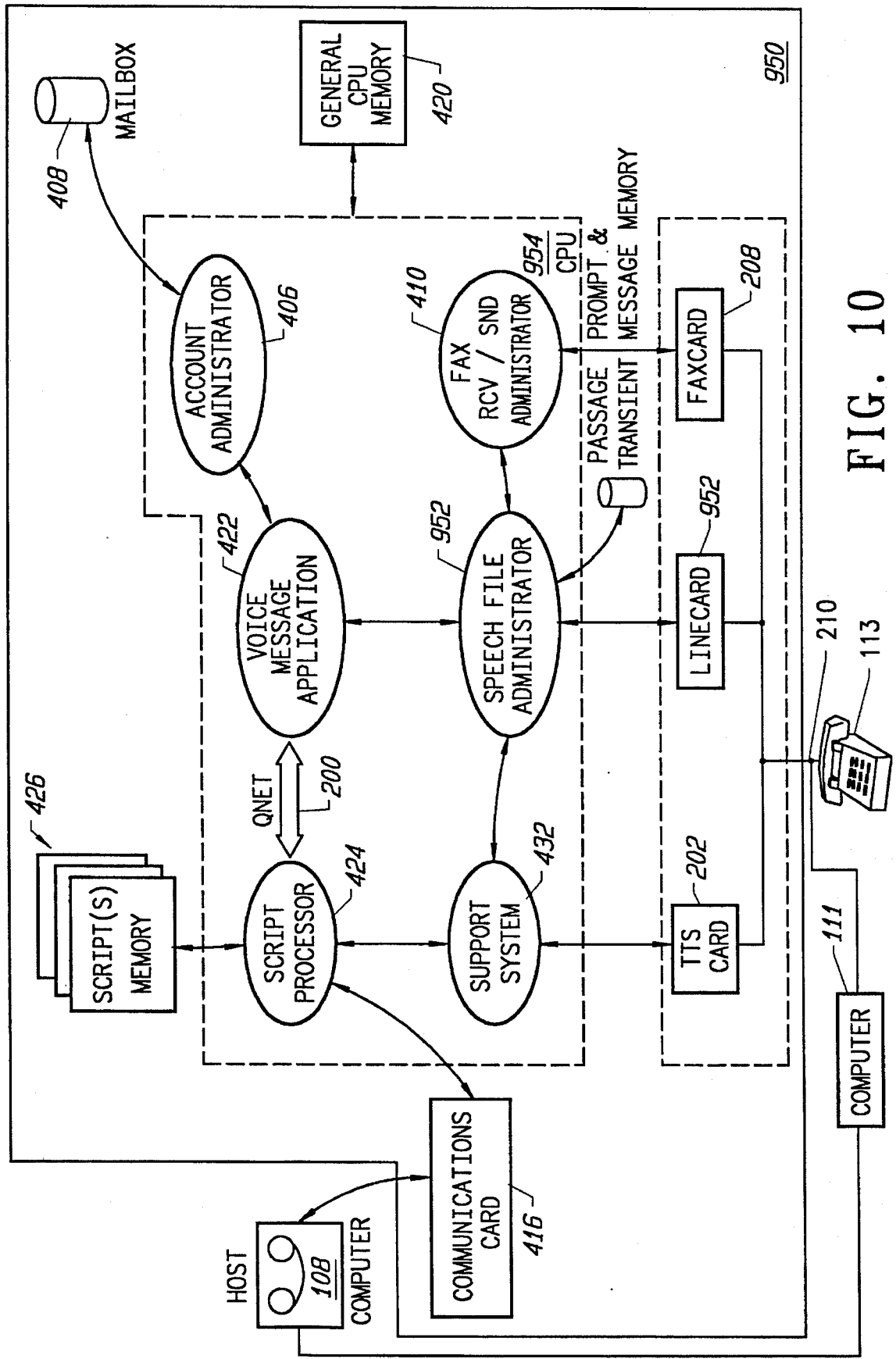
FIG. 10 depicts an alternative embodiment of the invention.

In FIG. 10 is shown an alternative embodiment of the invention. Therein, the voice message and text message systems are integrated into a single system 950 eliminating a number of redundant circuits and software routines. For instance, only a single linecard, FAXcard, and TTS combination circuit 952 is necessary. A combination circuit can be constructed upon a single circuit card using a digital signal processor (DSP) such as the TMS320C31 from Texas Instruments as the central component. In addition, the speech file administrator program 952 function which is accomplished in both systems in the preferred embodiment is accomplished as a single program in this alternative embodiment. Transparently over the network, the operating system maintains the cooperation between the main application programs 424, 422 as it accomplished in the preferred embodiment. The single system 950 operates in an identical manner to the dual systems described previously.

The entire system of the invention has now been disclosed. Attention presently turns to additional details associated with the operation of the personal computer 111 associated with the invention. Exemplary graphical interfaces were disclosed in relation to FIGS. 3B, 3C, and 3D. The graphical interfaces of the invention may rely upon Microsoft Windows graphical user interface standards.

Figure 11:
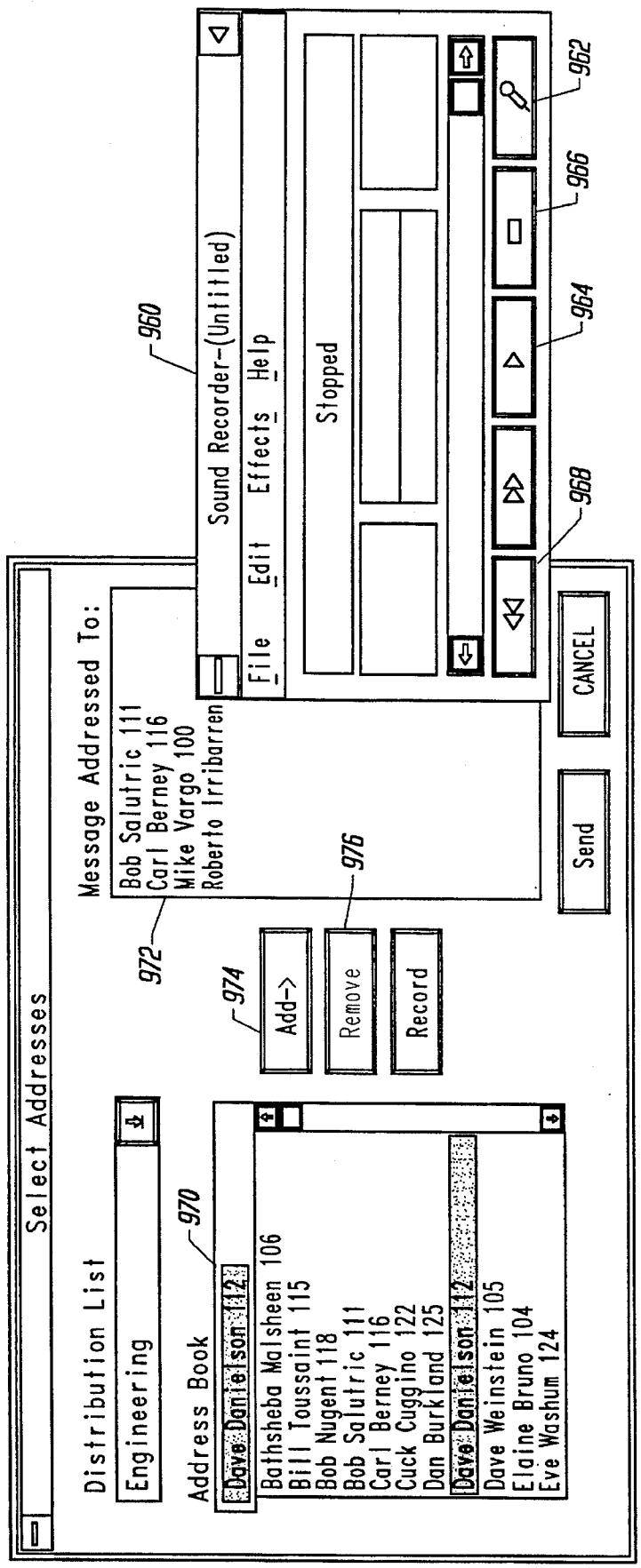
FIG. 11 depicts a computer interface which may be used in conjunction with the messaging function of the invention.

One skilled in the art will recognize a number of additional interfaces which may be utilized in accordance with the present invention. For example, FIG. 11 depicts an interface menu which may be used for recording and distributing messages. The sound recorder 960 has an intuitive interface. To record a message, the microphone button 962 is "depressed" by "pointing and clicking" with mouse 111C. After a message is recorded, the stop button 966 is "pressed". The message may be rewound by button 968. Special effects may be added to the message through the "effects" menu selection at the top of the screen. File and edit functions may also be selected from the top of the screen.

A preferable interface will include an "address book" 970 with a list of common addressees, as shown in the figure. A separate list 972 may be provided to enumerate the particular addressees for a particular message. "Pointing and clicking" to a name from the address book 970, and the subsequent "pointing and clicking" to the add button 974, will move a name from the address book to the message list 972. A name may be removed from either list in a similar fashion, by using the "remove" button 976.

Figure 12:
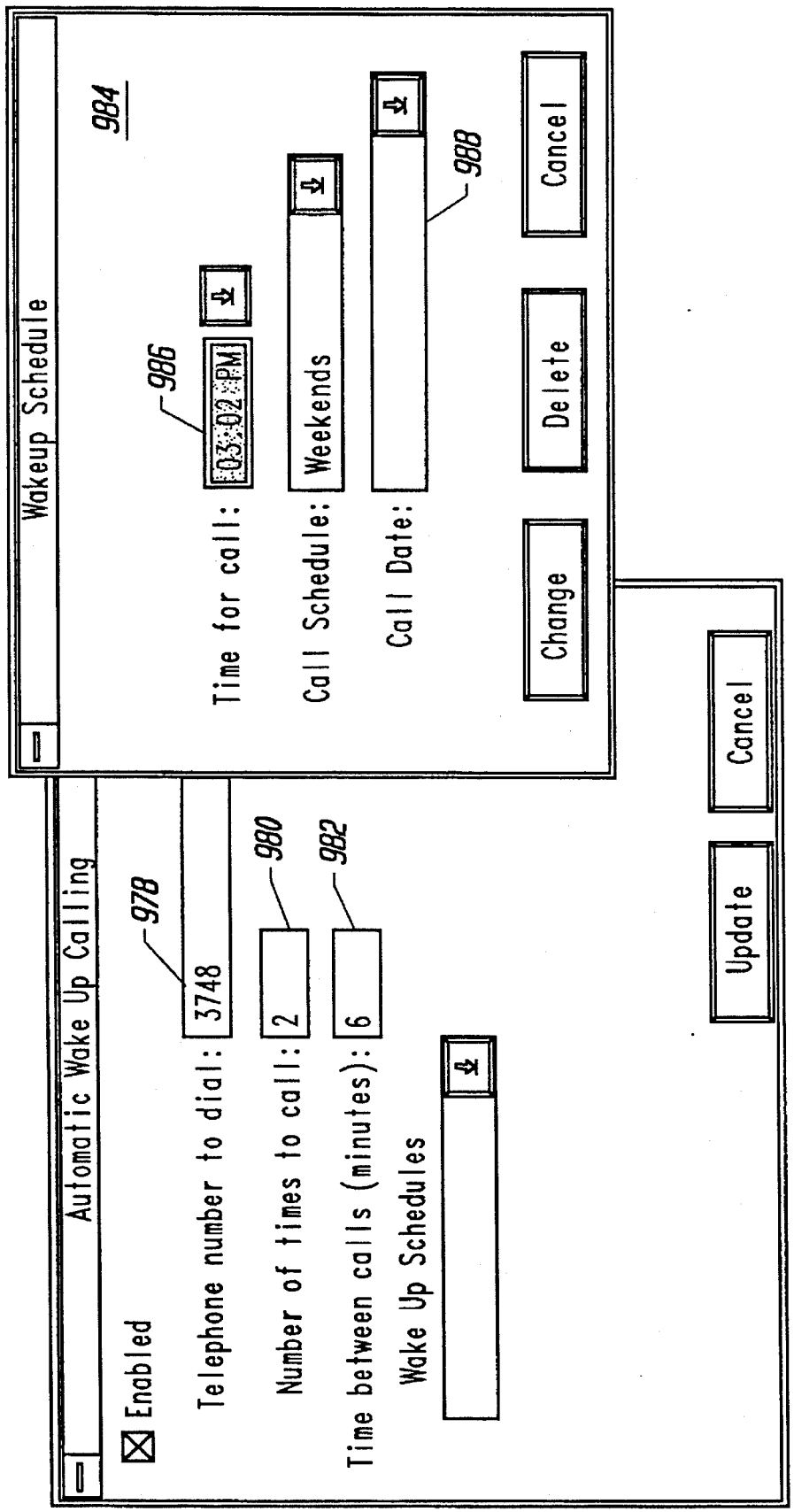
FIG. 12 depicts a computer interface which may be used in conjunction with a wake-up feature which may be used in accordance with the invention.

One skilled in the art will recognize that other features may be supported by the apparatus of the invention. For example, FIG. 12 depicts an interface which may be used to support an automatic wake-up calling feature. A user will enter information through the keyboard 111B to establish a wake-up call. As indicated in FIG. 12, the interface may include a field 978 for the telephone number to dial, a field 980 for the number of times to call, and a field 982 for the time between calls. An overlapped window 984 may be used to display a field 986 for the time of the call, and a field 988 for the date of the call. In view of the apparatus previously described herein, execution of the automatic wake-up calling feature will be straight-forward to one skilled in the art.

Figure 13:
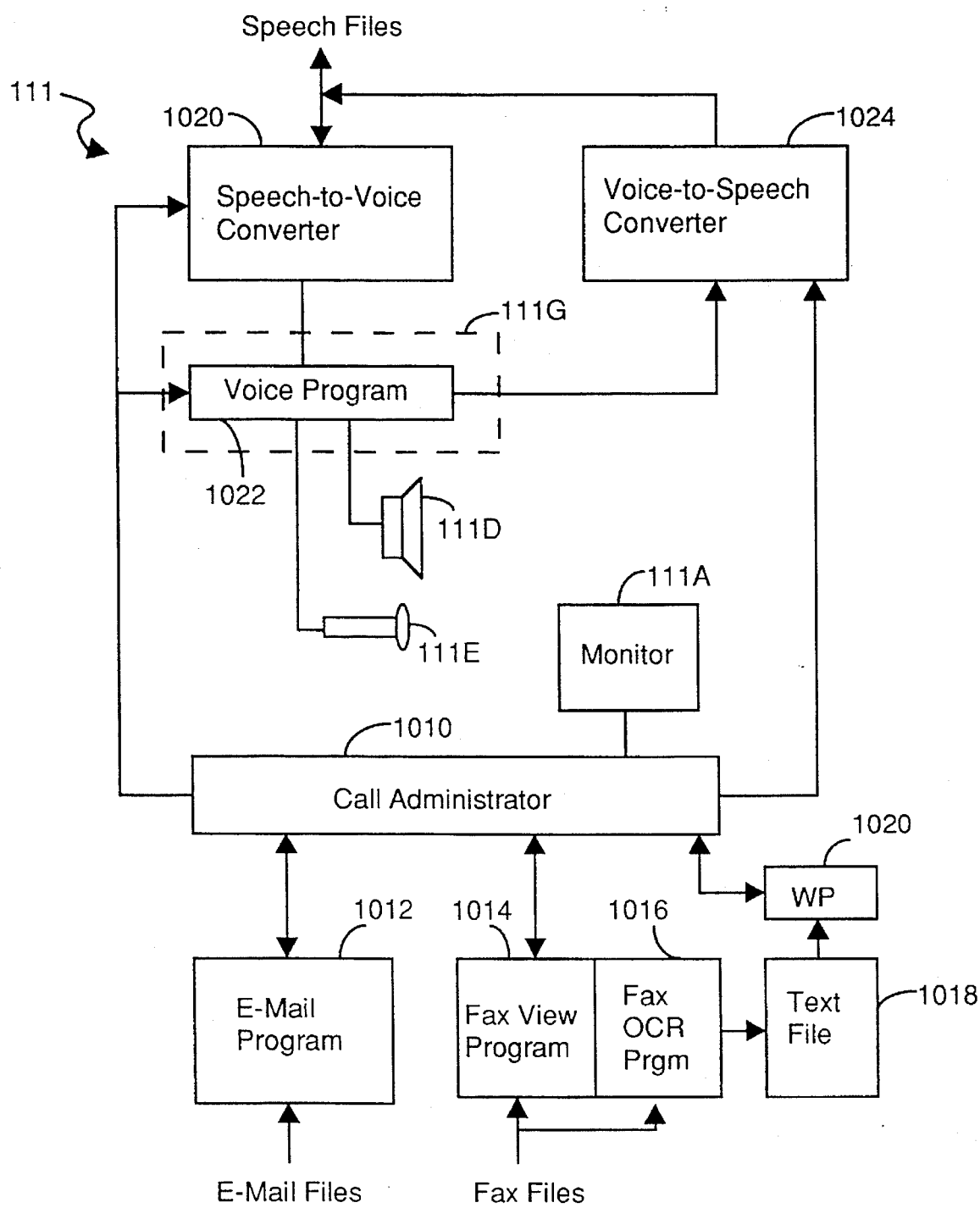
FIG. 13 depicts an apparatus for providing an interface between a text message system, a voice message system, and a personal computer.

FIG. 13 provides a more detailed representation of the important elements associated with a computer 111 which operates in accordance with the invention. The computer 111 executes a call administrator program 1010 which coordinates the E-Mail, voice mail, and fax processing functions which are realized in accordance with the invention. The call administrator 1010 interacts with the E-mail program 1012 which receives text files from the text message system 100. The E-mail program 1012 formats the received E-mail data to comply with the operating system running on the computer 111. The call administrator 1010 is then used to coordinate the display of the E-mail data on monitor 111A. In other words, the call administrator resolves contention issues for the use of monitor 111A, and therefore oversees which function will be displayed on monitor 111A.

The call administrator 1010 also coordinates fax processing. As reflected in FIG. 13, a fax file from voice message system 102 may be received by a fax view program 1014. Call administrator 1010 receives the data from the fax view program 1014, resolves monitor contention issues, and then directly presents the data on monitor 111A. That is, the fax is presented on monitor 111A in the format in which it was received, therefore no text handling of the fax data is possible through the fax view program. Text handling of fax data is possible with the fax OCR program 1016, which provides text recognition of the fax data. Fax OCR programs are known in the art. The text file 1018 generated by the fax OCR program may be conveyed to a word processing program 1020. The word processing program 1020 acts in conjunction with the call administrator 1010 to display the word processing data on monitor 111A.

In addition to controlling access to monitor 111A, the call administrator 1010 supervises the audio processing associated with the invention. As reflected in FIG. 13, speech files, either from voice message system 102 or text message system 100 (when text files are converted to speech through TTS linecard 202), are received by a speech-to-voice converter 1020. The speech-to-voice converter must be tailored for the particular speech format and the particular voice format being utilized. That is, a variety of approaches are known in the art for encoding speech. The encoded data must be decoded and then re-encoded for the particular voice program being used. Just as there are a number of speech encoding techniques known in the art, there are also a number of voice programs 1022 known in the art. As previously stated, in one embodiment of the invention, a Microsoft Multi-Media PC sound board 111G, with its corresponding voice program, is used. Speech-to-voice converted data is processed by board 111G and played over speaker 111D.

Speech data may also form input to the computer 111 through microphone 111E. Voice data received by microphone 111E is converted to speech data by voice-to-speech converter 1024. Again the particular details associated with the voice-to-speech converter 1024 will be contingent upon the voice program 1022 being used and the speech format being used.

Figure 14:
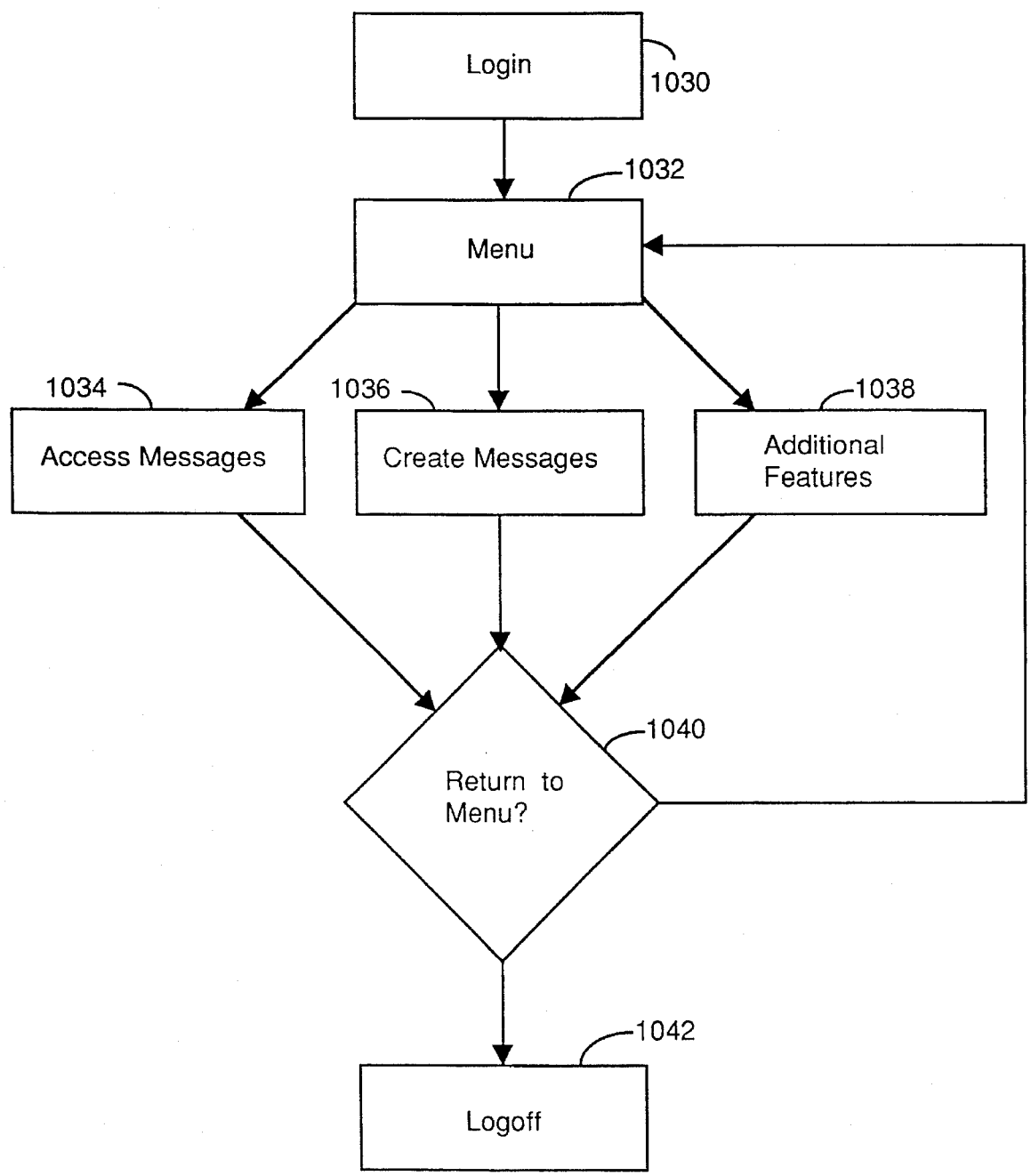
FIG. 14 provides a top-level description of the control sequence which may be exercised in accordance with the invention.

FIG. 14 provides a high-level representation of the operation of the call administrator 1010. Access to the call administrator commences with a login function (block 1030) which is executed in conjunction with monitor 111A. FIG. 3B shows a user interface which may be used to login to the call administrator, and FIG. 3C represents an interface which may be used to obtain mailbox information and password information required for access to the call administrator. This password is maintained in the user's voice mailbox database residing in the voice messaging system 110.

After an appropriate login sequence, a main menu may be displayed to the user over monitor 111 (block 1032). The main menu provides a number of user options. For instance, one option may be to access received messages (block 1034). FIG. 3D, which was previously discussed, depicts an interface which may be used to access received messages. Another selectable option from the main menu is "create messages" (block 1036). In the case of E-mail and fax messages, the message creation process is in accordance with prior art techniques. In creating voice messages, the present invention allows one to generate such messages through computer 111. FIG. 11, previously discussed, depicts an appropriate interface which may be used for the purpose of creating and distributing voice messages through a computer 111. As previously discussed, sound board 111G and microphone 111E are used to create voice messages.

The main menu may also provide access to additional features (block 1038) which may be supported by computer 111. The wake-up calling feature discussed in relation to FIG. 12 represents one such feature which may be employed in accordance with the invention.

After each menu selection is completed, the call administrator 1010 inquires whether a return to the menu is required (decision block 1040). If so, control returns to the main menu, otherwise a logoff from the call administrator is effected (block 1042).

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A communication system comprising:

voice message means for storing and retrieving voice messages, said voice message means including facsimile means for storing and retrieving facsimile data;

computer database accessing means for storing and retrieving text messages from a computer system and for converting said text messages into voice data;

individual computer processing means coupled to said voice message means and said computer database accessing means through an interface device, said individual computer processing means including means for interacting with a graphical user interface to coordinate access to said voice message means and said computer database accessing means; and network means for coordinating operation of said voice message means and said computer database accessing means responsive to commands originating from a user operating said individual computer processing means.

2. The communication system of claim 1 wherein said interface device includes a host computer operating as a server of a network.

3. The communication system of claim 1 wherein said interface device includes a telephone line to carry signals between said individual computer processing means and said computer database accessing means, said interface device thereby providing said individual computer processing means remote access to said computer database accessing means.

4. The communication system of claim 1 wherein said individual computer processing means includes a microphone, a speaker, and audio processing means to generate and play said voice messages obtained from said voice message means.

5. The communication system of claim 4 further comprising a text-to-speech translator for playing said text messages obtained from said computer database accessing means over said speaker.

6. The communication system of claim 1 further comprising a remotely positioned telephone coupled to said voice message means and said computer database accessing means through said interface device, said network means being responsive to commands entered at said telephone.

7. The communication system of claim 1 further comprising a plurality of remotely positioned telephones coupled to said voice message means and said computer database means through a corresponding plurality of interface devices.

8. The communication system of claim 1 further comprising a plurality of remotely positioned individual computer processing means coupled to said voice message means and said computer database means through a corresponding plurality of interface devices.

9. A communication system comprising:

a voice message system that stores and retrieves voice messages and facsimile data, said voice message system including a first transfer mechanism to generate a first transfer command in response to a first instruction;

a text message system that stores and retrieves text messages from a computer system, said text message system including a second transfer mechanism to generate a second transfer command in response to a second instruction;

a network coupled between said voice message system and said text message system for transferring master processing between said voice message system and said text message system in response to said first transfer command and said second transfer command, said first transfer command initiating a first control transfer wherein master processing is transferred from said voice message system to said text message system, said second transfer command initiating a second control transfer wherein master processing is transferred from said text message system to said voice message system; and an individual computer connectable through an interface to said text message system and said voice message system, said individual computer including a data processor and user interface devices for interacting with a graphical user interface allowing selection of said first instruction and said second instruction.

10. The communication system of claim 9 wherein said individual computer includes a microphone, a speaker, and audio processing means to generate and play said voice messages obtained from said voice message means.

11. The communication system of claim 10 further comprising a text-to-speech translator for playing said text messages from said text message system over said speaker.

12. The communication system of claim 9 further comprising a plurality of remotely located individual computers connectable through an interface to said text message system and said voice message system.

13. The communication system of claim 9 wherein said interface includes a telephone line to carry signals between said individual computer and said text message system.

14. The communication system of claim 9 wherein said interface is a host computer operating as a server of a network, said host computer being connected to said text message system.

* * * * *